United States Patent [19]

Cole et al.

[11] Patent Number: 4,690,961

[45] Date of Patent: Sep. 1, 1987

[54] SEALANT COMPOSITION

[75] Inventors: R. Clay Cole, Duncan; Bobby K. Bowles, Comanche, both of Okla.

[73] Assignee: Halliburton Company, Duncan, Okla.

[21] Appl. No.: 916,576

[22] Filed: Oct. 8, 1986

[51] Int. Cl.$^4$ .......................... C08K 3/26; C08K 3/08
[52] U.S. Cl. ...................... 523/440; 523/457
[58] Field of Search ............... 523/457, 440; 524/425, 524/906

[56] References Cited

U.S. PATENT DOCUMENTS

| | | | |
|---|---|---|---|
| 3,468,839 | 9/1969 | Millane | 523/457 |
| 3,849,366 | 11/1974 | Patrick | 523/457 |
| 4,320,047 | 3/1982 | Murphy et al. | 523/457 |
| 4,444,924 | 4/1984 | Grimmer | 523/457 |

FOREIGN PATENT DOCUMENTS

| | | | |
|---|---|---|---|
| 50-18599 | 2/1975 | Japan | 523/457 |
| 942833 | 11/1963 | United Kingdom | 523/457 |

OTHER PUBLICATIONS

Lee et al.; Handbook of Epoxy Resins; McGraw-Hill Book Co.; 1967; pp. 4-58, 4-59, 7-10.

Primary Examiner—Lewis T. Jacobs
Attorney, Agent, or Firm—Robert A. Kent

[57] ABSTRACT

A sealant composition which is particularly useful for sealing and locking pipe threads is provided. The composition is comprised of a hardenable liquid resin, a powdered inert filler dispersed in the resin, and a dispersing and thixotropy imparting agent comprised of a precipitated alkaline earth metal carbonate or a mixture of such carbonates.

12 Claims, No Drawings

SEALANT COMPOSITION

BACKGROUND OF THE INVENTION

1. Field of the Invention

The present invention relates to sealant compositions, and more particularly, sealant compositions useful for sealing and locking threaded pipe joints.

2. Description of the Prior Art

A great variety of sealant compositions have been developed and used in numerous applications heretofore. A number of such compositions include hardenable resins which set into hard masses when catalyzed, e.g., by contact with air, by heating, by being mixed with and catalyzed by a separate hardening agent, etc.

Sealant compositions have heretofore been comprised of a hardenable liquid resin which when mixed with a hardening agent sets into a hard mass, inert solids dispersed in the resin such as powdered metal, and a thixotropy imparting agent comprised of asbestos fibers. Such compositions have functioned satisfactorily. However, with the emphasis in recent years placed on preventing health hazards brought about by the exposure to asbestos fibers when such fibers are handled and mixed, the production of such sealant compositions has been curtailed or discontinued.

The asbestos containing sealant compositions were particularly suitable for sealing and locking threaded pipe joints such as oil and gas well casing joints in that the asbestos imparted thixotropic properties to the compositions whereby they did not sag or run when placed on threads prior to joining the coated threads. Further, the asbestos functioned to keep the suspended solids in the composition from settling-out and caking at the bottom of containers during prolonged storage periods.

Thus there is a need for a sealant composition having similar or improved thixotropic properties.

SUMMARY OF THE INVENTION

A sealant composition comprised of a hardenable liquid resin which when mixed with a hardening agent sets into a hard mass, a powdered inert filler dispersed in the resin, and a dispersing and thixotropy imparting agent is provided. The dispersing and thixotropy imparting agent is comprised of a precipitated alkaline earth metal carbonate or a mixture of such carbonates.

The sealant composition is utilized by mixing a hardening agent with the composition and then placing the composition on an area or a surface to be sealed. The composition has thixotropic properties prior to setting, i.e., it does not run or appreciably sag, and the composition subsequently sets into a hard mass.

Various hardenable liquid resins, hardening agents therefor and fillers such as metals, graphite and silica can be utilized in the compositions. The dispersing and thixotropy imparting agent maintains the filler in suspension for long periods of time thereby preventing premature fluid separation or settling. However, the compositions retain a workable uniform texture and a moderate viscosity such that the hardening agent utilized can be readily and uniformly admixed therewith prior to use.

The features, advantages and objects of the invention recited above, as well as others, will be well understood by those skilled in the art upon a reading of the description of preferred embodiments which follows.

DESCRIPTION OF PREFERRED EMBODIMENTS

The sealant composition of the present invention can be utilized in many applications, but it is particularly suitable as a pipe thread sealing and locking composition. In a number of pipe thread sealing and locking applications, particularly those in the oil industry, the application of sealant to pipe threads is often carried out with the pipe positioned vertically. As a result, the sealant utilized must have thixotropic properties whereby it does not run or appreciably sag after being applied.

The sealant composition of the present invention which exhibits the required thixotropic and other properties is comprised of a hardenable liquid resin, a particulate inert solid filler dispersed in the resin, and a dispersing and thixotropy imparting agent.

The hardenable liquid resin can be any of a variety of liquid resins which set or can be caused to set into hard masses within reasonable periods of time after being applied to surfaces. Particularly suitable resins are those which do not harden at all until mixed or otherwise contacted with separate hardening agents, and then set into hard masses after relatively short time periods. Examples of suitable commercially available epoxy resins are those sold under the trade designations EPON 815-840 by Shell Chemical Co. of Houston, Texas; those sold under the trade designations EPI-REZ 509, 510, 5071 and 5077 by Celanese Chemical Co. of New York; and those sold under the trade designations 506, 6005, 6010 and 6020 by Ciba-Geigy Corp. of Greensboro, North Carolina. Generally, epoxy resins which are the condensation products of epichlorohydrin and bisphenol-A having weights per epoxide in the range of from about 150 to about 350 are preferred. Separate hardening agents which can be utilized to catalyze the foregoing resins whereby they set into hard masses are diethylenetriamine, triethylenetetramine and tetraethylenepentamine.

A preferred hardenable liquid resin which when mixed with a hardening agent sets into a hard mass is comprised of the condensation product of epichlorohydrin and bisphenol-A having a weight per epoxide in the range of from about 175 to about 195. Such resin can be catalyzed by combining one of the above described amines therewith, preferably tetraethylenepentamine.

The most preferred resin is comprised of a mixture of the condensation product of epichlorohydrin and bisphenol-A having a weight per epoxide of about 175 to 195 diluted with butylglycidyl ether in an amount in the range of from about 8% to about 12% by weight of the resin. The diluted resin can be caused to harden by combining tetraethylenepentamine therewith in an amount in the range of from about 5 parts per 100 parts resin to about 15 parts per 100 parts resin. The mixture sets into a hard mass depending on the temperature thereof in a time period in the range of from about 60 to about 200 minutes after mixing.

In order to increase the thread locking ability of the sealing compositions, galling of the threads is promoted by including a particulate solid filler therein. While a variety of fillers can be utilized, those selected from the group consisting of powdered non-reactive metals, graphite, silicon carbide, silica and mixtures thereof are particularly suitable. The preferred filler for use in accordance with this invention is powdered aluminum, at least 70% of which is finer than 325 mesh, U.S. Sieve Series.

The solid filler utilized is preferably dispersed in the resin or diluted resin in an amount in the range of from about 20% to about 75% by weight of the sealant composition. When powdered aluminum is utilized, it is preferably present in the sealant composition in an amount of about 45% to about 50% by weight of the total composition.

In order to facilitate the dispersal and maintain the filler suspended in the liquid resin as well as to impart thixotropy to the sealant composition, a dispersing and thixotropy imparting agent is combined with the composition selected from the group consisting of a precipitated alkaline earth metal carbonate or a mixture of such carbonates. The fibrous precipitated alkaline earth metal carbonate or mixture maintains the filler in suspension in the resin and imparts thixotropic properties to the sealing composition whereby the composition will not run or appreciably sag after being applied to a surface. Of the various precipitated alkaline earth metal carbonates which can be utilized, precipitated calcium carbonate is the most preferred.

The precipitated alkaline earth metal carbonate or mixture thereof utilized is combined with the sealant composition in an amount in the range of from about 10% to about 50% by weight of the sealant composition, most preferably about 15% to about 20% by weight.

A particularly suitable and preferred sealant composition of the present invention is comprised of a hardenable liquid resin comprised of the condensation product of epichlorohydrin and bisphenol-A having a weight per epoxide of from about 175 to about 195 which sets into a hard mass when mixed with tetraethylenepentamine, a filler comprised of powdered aluminum present in the composition in an amount in the range of from about 10% to about 90% by weight of the composition and a dispersing and thixotropy imparting agent comprised of a precipitated alkaline earth metal carbonate or a mixture of such carbonates present in the composition in an amount in the range of from about 10% to about 50% by weight of the composition.

The most preferred sealant composition of this invention which is particularly suitable as a pipe thread sealing and locking composition is comprised of the condensation product of epichlorohydrin and bisphenol-A having a weight per epoxide of about 175 to about 195, a resin diluent comprised of butylglycidyl ether in an amount in the range of from about 8% to about 12% by weight of the resin, most preferably about 11% by weight, powdered aluminum filler at least 70% of which is finer than 325 mesh, U.S. Sieve Series, dispersed in the diluted resin in an amount in the range of from about 45% to about 50% by weight of the composition, most preferably about 48% by weight, and a dispersing and thixotropy imparting agent comprised of precipitated calcium carbonate present in the composition in an amount in the range of from about 10% to about 20% by weight of the composition, most preferably about 16.6% by weight. The second part of the composition which is mixed with the first part described above prior to applying the composition to one or more surfaces to be sealed is comprised of tetraethylenepentamine hardening agent. The tetraethylenepentamine is mixed with the first part in the range of from about 2.5% to about 5.0% by weight of the first part, most preferably about 3.8% by weight. When the resulting mixture is applied to a surface to be sealed, such as pipe threads, and after a time period of about 60 to about 200 minutes, depending upon the particular temperature of the composition, the mixture hardens into a hard mass.

In order to further illustrate the present invention and facilitate a clear understanding thereof, the following examples are given.

EXAMPLE 1

Sealant compositions without hardening agent fixed therewith comprised of the condensation product of epichlorohydrin and bisphenol-A having a weight per epoxide of about 175 to about 195, powdered aluminum and various dispersing and thixotropy imparting agents are prepared. The resin and powdered aluminum are first fixed at room temperature. The temperature of the mixture is then raised to 130° F. whereupon the dispersing the thixotropy imparting agent utilized is combined therewith. For each composition, the dispersing and thixotropy imparting agent is combined with the resin-aluminum mixture at 130° F. in an amount whereby the resulting composition exhibits thixotropic properties. The components and amounts thereof included in the various compositions are given in Table I below.

TABLE I

Sealant Compositions Without Hardening Agents

| Components | Compositions | | | | | | |
|---|---|---|---|---|---|---|---|
| | No. 1 | No. 2 | No. 3 | No. 4 | No. 5 | No. 6 | No. 7 |
| Resin[1] | 191 gm | 191 gm | 191 gm | 191 gm | 191 gm | 191 gm | 191 gm |
| Powdered Aluminum[2] | 260 gm | 260 gm | 260 gm | 260 gm | 260 gm | 260 gm | 260 gm |
| Asbestos[3] | — | — | — | — | — | — | 6 gm |
| Cotten linters | 32.5 | — | — | — | — | — | — |
| Precipitated Calcium Carbonate[4] | — | 90 | — | — | — | — | — |
| Surface Treated Precipitated CaCO$_3$[5] | — | — | 90 | — | — | — | — |
| Wood pulp | — | — | — | 35 | — | — | — |
| Hydrated amorphous Silica[6] | — | — | — | — | 22 | — | — |
| Amorphous Non- | — | — | — | — | — | 14 | — |

TABLE I-continued

Sealant Compositions Without Hardening Agents

| Components | No. 1 | No. 2 | No. 3 | No. 4 | No. 5 | No. 6 | No. 7 |
|---|---|---|---|---|---|---|---|
| Crystalline Silica[7] | | | | | | | |

[1]Epon 815 - a liquid resin comprised of the condensation product of epichlorohydrin and bisphenol-A having a weight per epoxide of about 174–195 sold by Shell Chemicl Co.
[2]Reynolds Metals 120 or Alcon Metals 101
[3]Calidria RG 244 sold by Union Carbide Corp.
[4]Multiflex MM sold by Pfizer, Inc.
[5]Multiflex SC sold by Pfizer, Inc.
[6]Hi-Sil 233 sold by Pittsburgh Plate Glass Co.
[7]Syloid 266 sold by Davidson Chemical Co.

The compositions are placed in sealed cans, allowed to cool to room temperature and remain undisturbed for 24 hours. The cans are then opened and evaluated for texture, free fluid, filler settling, ease of remixing and thixotropy. After evaluation, the cans are resealed, stored and the evaluations are repeated once a month over a three-month period. Finally, the cans are resealed and stored outdoors at summer-time temperatures for one month and again evaluated. The results of these tests are given in Table II below.

TABLE II

| Composition No. | Time & Conditions | Texture | Free Fluid (resin separated) | Filler Settling | Ease of Remixing | Thixotropy (Ability to Stand in Place) |
|---|---|---|---|---|---|---|
| 1 | 24 hrs. after mixing | dull, dry | about 10 cc | slight | slight difficulty | very good |
|  | 3 mos. at 75° F. | core, dull | 20–25 cc | extensive, packed | very difficult | poor |
|  | + 1 mo. summer temps | two phase | ½", 30 cc | yes, very compacted | almost impossible | poor |
| 2 | 28 hrs. after mixing | glossy, few small lumps | none | none | not necessary | very good |
|  | 3 mos. at 75° F. | glossy, smooth | ½ cc | hardly any | very easy | good |
|  | + 1 mo. summer temps | glossy, smooth | ½ cc | hardly any | very easy | good |
| 3 | 24 hrs. after mixing | smooth, glossy | none | none | not necessary | very good |
|  | 3 mos. at 75° F. | smooth, glossy | trace | none | not necessary | very good |
|  | + 1 mo. summer temps | smooth, glossy | trace | none | very easy | very good |
| 4 | 24 hrs. after mixing | coarse, dull | about 5 cc | slight | slight difficulty | fair |
|  | 3 mos. at 75° F. | coarse, dull | about 20 cc | extensive, packed | fairly difficult | poor |
|  | + 1 mo. summer temps | two phase | ½", 30 cc | extensive, packed | almost impossible | poor |
| 5 | 24 hrs. after mixing | coarse, dry | about 1 cc | none | easy | very good |
|  | 3 mos. at 75° F. | glossy, smooth | about 15–20 cc | extensive | very difficult | fair |
|  | + 1 mo. summer temps | two phase | about 30 cc | all filler packed hard | impossible | poor |
| 6 | 24 hrs. after mixing | smooth, med. gloss | none | none | not necessary | very good |
|  | 3 mos. at 75° F. | smooth, med. gloss | 1–3 cc | none | easy | good |
|  | + 1 mo. summer temps | smooth, med. gloss | 10–15 cc | slight | slight difficulty | poor |
| 7 | 24 hrs. after mixing | smooth, glossy | none | none | not necessary | very good |
|  | 3 mos at 75° F. | smooth, glossy | about 1 cc | none | not necessary | very good |
|  | + 1 mo. summer temps | smooth, glossy | about 1–2 cc | none | very easy | very good |

EXAMPLE 2

Portions of the compositions described in Example 1 above are used to perform thread locking strength tests. Groups of three (3) ½"×3" standard threaded bolts are coated with the compositions after they are mixed with tetraethylenepentamine. Nuts are then threaded onto the coated threads of the bolts whereby all of the threads of the nuts are engaged by bolt threads. The compositions on the bolts are allowed to cure at room temperature for 24 hours prior to the removal of the nuts from the bolts utilizing a torque wrench. The force required to initially turn the nuts with the torque wrench are noted. The results of these tests are given in Table III below.

TABLE III

Composition Thread Locking Strengths

| Test | No. 1 | No. 2 | No. 3 | No. 4 | No. 5 | No. 6 | No. 7 |
|---|---|---|---|---|---|---|---|
| 1st Bolt and Nut | 7.5 ft-lb | 15 ft-lb | 16 ft-lb | 6 ft-lb | 11 ft-lb | 9 ft-lb | 17 ft-lb |
| 2nd Bolt and Nut | 9 ft-lb | 30 ft-lb | 20 ft-lb | 5 ft-lb | 14 ft-lb | 13 ft-lb | 7.5 ft-lb |
| 3rd Bolt and Nut | 6 ft-lb | 10 ft-lb | 16 ft-lb | 7 ft-lb | 15 ft-lb | 9 ft-lb | 24 ft-lb |
| Average | 7.5 ft-lb | 18.33 ft-lb | 17.33 ft-lb | 6 ft-lb | 13.33 ft-lb | 10.33 ft-lb | 19.5 ft-lb |

From the above examples it can be seen that the sealant compositions of this invention possess excellent strength, storage, thixotropy and other properties.

The preceding examples can be repeated with similar success by substituting the generically or specifically described components and reactants of this invention for those used in the examples. From the foregoing description, one skilled in the art can easily ascertain the essential characteristics of this invention, and without departing from the spirit and scope thereof, can make various changes and modifications to adapt the invention to various usages and conditions.

What is claimed is:

1. A sealant composition comprising a hardenable liquid resin which can be caused to set into a hard mass, comprisng the condensation product of epichlorohydrin and bisphenol-A having a weight per expoxide of about 175 to about 195 diluted with butylglycidyl ether, a powdered inert filler dispersed in said resin, and a dispersing and thixotropy imparting agent comprised of precipitated calcium carbonate present in said composition in an amount in the range of about 10% to about 50% by weight of said composition.

2. The composition of claim 1 wherein said powdered filler is aluminum at least 70% of which is finer than 325 mesh, U.S. Sieve Series.

3. The composition of claim 1 wherein said resin is caused to set by mixing a hardening agent comprised of tetraethylenepentamine therewith.

4. An improved sealant composition comprising a hardenable liquid resin which when mixed with a hardening agent sets into a hard mass selected from the group consisting of the condensation products of epichlorohydrin and bisphenol-A having weights per epoxide of from about 150 to about 350 and mixtures of said resins, a filler comprised of powdered aluminum present in said composition in an amount in the range of from about 10% to about 90% by weight of said composition and a dispersing and thixotropy imparting agent comprised of a precipitated alkaline earth metal carbonate or a mixture of such carbonates present in said composition in an amount in the range of from about 10% to about 50% by weight of said composition.

5. The composition of claim 4 wherein said hardenable resin is the condensation product of epichlorohydrin and bisphenol-A having a weight per epoxide of from about 175 to about 195 and said hardening is an amine.

6. The composition of claim 5 wherein said hardening agent is tetraethylenepentamine.

7. The composition of claim 4 wherein at least 70% of said powdered aluminum is finer than 325 mesh, U.S. Sieve Series.

8. The composition of claim 7 wherein said powdered aluminum is present in said composition in an amount of from about 45% to about 50% by weight of said composition.

9. The composition of claim 4 wherein said dispersing and thixotropy imparting agent is precipitated calcium carbonate.

10. An improved two-part pipe thread sealant composition which when the two parts are mixed sets into a hard mass, the first part being comprised of a hardenable liquid resin comprising the condensation product of epichlorohydrin and bisphenol-A having a weight per epoxide of from about 175 to about 195 diluted with butylglycidyl ether, a filler comprising powdered aluminum at least 70% of which is finer than 325 mesh, U.S. Sieve Series present in an amount of about 45% to about 50% by weight of said composition and a dispersing and thixotropy imparting agent comprised of a precipitated alkaline earth metal carbonate or a mixture of such carbonates, and the second part being comprised of a hardening agent comprising tetraethylenepentamine.

11. The composition of claim 10 wherein said dispersing and thixotropy imparting agent is precipitated calcium carbonate.

12. The composition of claim 11 wherein said precipitated calcium carbonate is present in said composition in an amount of about 16.6% by weight of said composition.

* * * * *

UNITED STATES PATENT AND TRADEMARK OFFICE
CERTIFICATE OF CORRECTION

PATENT NO. : 4,690,961

DATED : September 1, 1987

INVENTOR(S) : R. Clay Cole and Bobby K. Bowles

It is certified that error appears in the above-identified patent and that said Letters Patent is hereby corrected as shown below:

In column 5, TABLE 1-continued, footnote[1], following the phrase "epoxide of about 174-195" should read -- epoxide of about 175-195 --.

In column 6, line 67, the word "expoxide" should read -- epoxide --.

Signed and Sealed this

Twenty-ninth Day of March, 1988

Attest:

DONALD J. QUIGG

*Attesting Officer*   *Commissioner of Patents and Trademarks*